(12) United States Patent
Adatrao et al.

(10) Patent No.: US 7,242,941 B2
(45) Date of Patent: Jul. 10, 2007

(54) METHOD AND APPARATUS FOR PERFORMING SOFT-HANDOFF IN A WIRELESS COMMUNICATION SYSTEM

(75) Inventors: Ravi M. Adatrao, Palatine, IL (US); Ming Dai, Crystal Lake, IL (US); Jonathan H. Gross, Gilbert, AZ (US); Harn-Jier Lin, Lisle, IL (US); Takeshi Morishima, Hoffman Estates, IL (US); Daniel J. DeClerck, Lake Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 211 days.

(21) Appl. No.: 10/439,743

(22) Filed: May 16, 2003

(65) Prior Publication Data

US 2004/0229618 A1 Nov. 18, 2004

(51) Int. Cl.
*H04Q 7/20* (2006.01)
*H04Q 7/00* (2006.01)

(52) U.S. Cl. ............... 455/442; 455/437; 455/436; 455/438; 370/331; 370/332

(58) Field of Classification Search ............ 455/438, 455/439, 442, 436, 437, 452.2; 370/331, 370/332, 333
See application file for complete search history.

(56) References Cited

U.S. PATENT DOCUMENTS 6,058,107 A * 5/2000 Love et al. .................. 370/332
6,148,207 A * 11/2000 Baum et al. ................. 455/442
6,337,984 B1 * 1/2002 Hong et al. .................. 455/439
6,434,367 B1 * 8/2002 Kumar et al. ................. 455/70
6,704,299 B1 * 3/2004 Li et al. ...................... 370/332
2001/0021642 A1 * 9/2001 Iida ........................... 455/67.1
2001/0053128 A1 * 12/2001 Lee ............................ 370/244

* cited by examiner

*Primary Examiner*—Charles N. Appiah
*Assistant Examiner*—Olivia Marsh
(74) *Attorney, Agent, or Firm*—Kenneth A. Haas; Steven A. May (57) ABSTRACT

A mobile station typically determines whether to drop a communication link and/or a base transceiver station (BTS) based on a performance of an associated forward link. In order to avoid dropping a communication link that has a weak forward link but a strong reverse link, a communication system is provided that determines whether the reverse link is still good before determining to drop the communication link. In one embodiment, the communication system determines whether reverse link is still good based on a quality metric associated with the reverse link and quality metric(s) associated with one or more other reverse links that are in a soft-handoff mode with reverse link. In another embodiment, the communication system determines whether reverse link is still good by comparing a quality metric associated with the reverse link to a threshold.

23 Claims, 6 Drawing Sheets

METHOD AND APPARATUS FOR PERFORMING SOFT-HANDOFF IN A WIRELESS COMMUNICATION SYSTEM

FIELD OF THE INVENTION

The present invention relates generally to wireless communication systems, and, in particular, to soft-handoffs in a wireless communication system.

BACKGROUND OF THE INVENTION

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of one or more Base Transceiver Stations (BTS's) coupled to one or more Base Station Controllers (BSCs) or Central Base Station Controllers (CBSCs) and forming a Base Station Subsystem (BSS). The BSCs or CBSCs are, in turn, coupled to a Mobile Switching Center (MSC) which provides a connection between the BSS and an external network, such as a Public Switched Telephone Network (PSTN), as well as interconnection to other BSSs. Each BTS provides communication services to a mobile station (MS) located in a coverage area serviced by the BTS via a communication resource that includes a forward link for transmitting signals to, and a reverse link for receiving signals from, the MS.

Fundamental to a wireless communication system is the ability to maintain established communication connections while an MS moves in and between coverage areas. In order to maintain established communication connections, 'soft-handoff' techniques have been developed for code division multiple access (CDMA) communication systems whereby an MS is in concurrent, active communication with multiple BTSs. Each BTS in active communication with the MS is a member of an 'active set' of the MS and transmits bearer traffic to, and receives bearer traffic from, the MS. As the MS moves through the communication system, BTSs are added to, or deleted from, the MS's active set so as to assure that the MS will always be in communication with at least one BTS.

Figure 1:
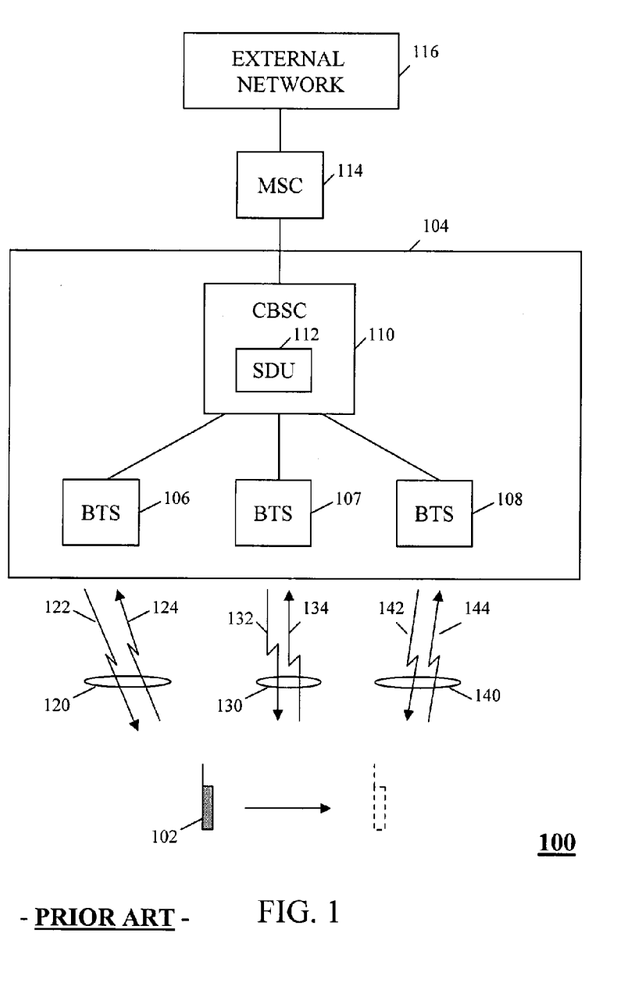
FIG. 1 is a block diagram of a wireless communication system of the prior art.

For example, FIG. 1 is block diagram of a CDMA wireless communication system 100 of the prior art. Communication system 100 includes a BSS 104 comprising multiple BTSs 106-108 that are each coupled to a CBSC 110. BSS 104 is coupled to an MSC 114 and MSC 114 is in turn coupled to an external network 116 and provides a communication link between the external network, or other BSSs, and BSS 104. Communication system 100 further includes an MS 102 that concurrently is in active communication with each of BTS 106 and 107. That is, MS 102 is in 'soft-handoff' with each of BTSs 106 and 107 and each of BTS 106 and BTS 107 is a member of an 'active set' of MS 102. As members of the active set of MS 102, each BTS of BTSs 106 and 107 concurrently maintains a respective wireless communication link 120, 130 with the MS. Each communication link 120, 130 includes a respective forward link 122, 132, for conveyance of signals to MS 102 and a respective reverse link 124, 134, for receipt of signals from the MS.

Each BTS 106, 107 in the active set of MS 102 conveys the same bearer traffic to, and receives the same bearer traffic from, the MS. By providing multiple BTSs that concurrently convey same signals to, and receive same signals, from MS 102, communication system 100 enhances the likelihood that the MS will receive an acceptable quality signal from BSS 104 and that the BSS will receive an acceptable quality signal from the MS. For example, when each BTS of BTSs 106 and 107 receives a same frame from MS 102, the BTS determines whether the received frame is acceptable or erroneous and forwards the frame, and an accompanying indicator of whether the frame is acceptable, that is, good, or erroneous, that is, erased, to CBSC 110. CBSC 110, specifically a selection and distribution unit (SDU) 112 included in the CBSC, then selects a version of the received frame from among the versions received from BTSs 106 and 107 and forwards the selected version to MSC 114.

As MS 102 heads towards a coverage area, or sector, associated with BTS 108, a signal strength of a pilot signal received by MS 102 from BTS 108 via a forward link 142 associated with BTS 108 increases until MS 102 identifies the pilot signal from BTS 108 as a viable communication link. In addition, as MS 102 heads away from a coverage area, or sector, associated with BTS 106 a signal strength of a pilot signal received by MS 102 from BTS 106 via forward link 122 may deteriorate to the point that MS 102 determines that communication link 120 is no longer a viable communication link. MS 102 then requests that communication system 100 add BTS 108 to the MS's active set, that is, establish a communication link 140 associated with BTS 108, comprising forward link 142 and a reverse link 144, as an active communication link for transmitting data to, and receiving data from, MS 102, and drop BTS 106 from the active set, that is, terminate communication link 120. Typically, the request to drop a BTS is conveyed by MS 102 via a Pilot Strength Measurement Message (PSMM). Upon receiving the PSMM message, BSS 104 drops BTS 106 from the active set of MS 102 and terminates, or drops, communication link 120 between MS 102 and BTS 106.

A decision to add or drop a communication link 120, 130, 140 and a corresponding BTS 106, 107, 108 from an active set is based on a forward link measurement, that is, a measurement of a signal strength of a pilot signal received by an MS, such as MS 102, via a corresponding forward link. That is, in making an add and/or drop decision, communication system 100 assumes that a performance of a forward link 122, 132, 142 is substantially identical to a performance of a corresponding reverse link 124, 134, and 144. However, a problem arises when there is an imbalance between a performance of a forward link, such as forward links 122, 132, 142, and a performance of a corresponding reverse link, that is, respective reverse links 124, 134, and 144. For example, a sector serviced by a BTS may be subject to interference particular to a reverse link, or propagation paths and fading associated with each of a forward link and a reverse link in a sector may be different due to frequency band separation between the forward and reverse links. As a result, in some cases a communication link with a strong reverse link may be dropped due to a weak forward link. When the reverse link of the dropped communication link, such as reverse link 124 of communication link 120, is the only good reverse link of multiple reverse links, such as reverse links 124 and 134, utilized by an MS then the dropping of the communication link may result in a dropped call.

Thus, a need exists to ensure that a communication link is not terminated, or dropped, as part of a soft-handoff until such time as the communication system may confirm that a good reverse link is not thereby being dropped.

DETAILED DESCRIPTION OF THE INVENTION

To address the need for a method and an apparatus that ensures that a communication link is not terminated, or dropped, as part of a soft-handoff until such time as the communication system may confirm that a good reverse link is not thereby being dropped, a communication system is provided that determines whether the reverse link is still good before determining to drop the communication link. In one embodiment, the communication system determines whether reverse link is still good based on a quality metric associated with the reverse link and quality metric(s) associated with one or more other reverse links that are in a soft-handoff mode with reverse link. In another embodiment, the communication system determines whether reverse link is still good by comparing a quality metric associated with the reverse link to a threshold. The communication system further provides for an infrastructure of the system to initiate a re-determination of whether to drop the communication link, thereby preventing a communication with an MS to deteriorate to unacceptable levels as a result of maintaining a possibly marginal communication link.

Generally, an embodiment of the present invention encompasses a method for performing a soft-handoff in a wireless communication system. The method includes receiving a plurality of frames from a mobile station via each of a first reverse link and a second reverse link, determining a first reverse link quality metric based on the plurality of frames received via the first reverse link, and determining a second reverse link quality metric based on the plurality of frames received via the second reverse link. The method further includes receiving a request to drop a communication link comprising the first reverse link, comparing the first reverse link quality metric to the second reverse link quality metric to produce a comparison, and in response to receiving the request, determining whether to drop the communication link based on the comparison.

Another embodiment of the present invention encompasses a method for performing a soft-handoff in a wireless communication system. The method includes receiving a plurality of frames from a mobile station via a reverse link and determining a reverse link quality metric based on the plurality of frames. The method further includes receiving a request to drop a communication link comprising the reverse link, comparing the reverse link quality metric to a threshold to produce a comparison, and in response to receiving the request, determining whether to drop the communication link based on the comparison.

Yet another an embodiment of the present invention encompasses, in a wireless infrastructure, an apparatus for performing a soft-handoff. The apparatus includes a processor that receives a plurality of frames from a mobile station via each of a first reverse link and a second reverse link, determines a first reverse link quality metric based on the a plurality of frames received via the first reverse link, determines a second reverse link quality metric based on the a plurality of frames received via the second reverse link, and compares the first reverse link quality metric to the second reverse link quality metric to produce a comparison. The processor further receives a request to drop a communication link comprising the first reverse link, and in response to receiving the request, determines whether to drop the communication link based on the comparison.

Still another embodiment of the present invention encompasses, in a wireless infrastructure, an apparatus for performing a soft-handoff. The apparatus includes a processor coupled to one or more memory devices. The processor receives a plurality of frames from a mobile station via a reverse link, stores a quality indicator associated with each frame of the plurality of frames in the one or more memory devices, determines a reverse link quality metric based on the stored quality indicators, and compares the reverse link quality metric to a threshold to produce a comparison. The processor further receives a request to drop a communication link comprising the reverse link, and in response to receiving the request, determines whether to drop the communication link based on the comparison.

Figure 2:
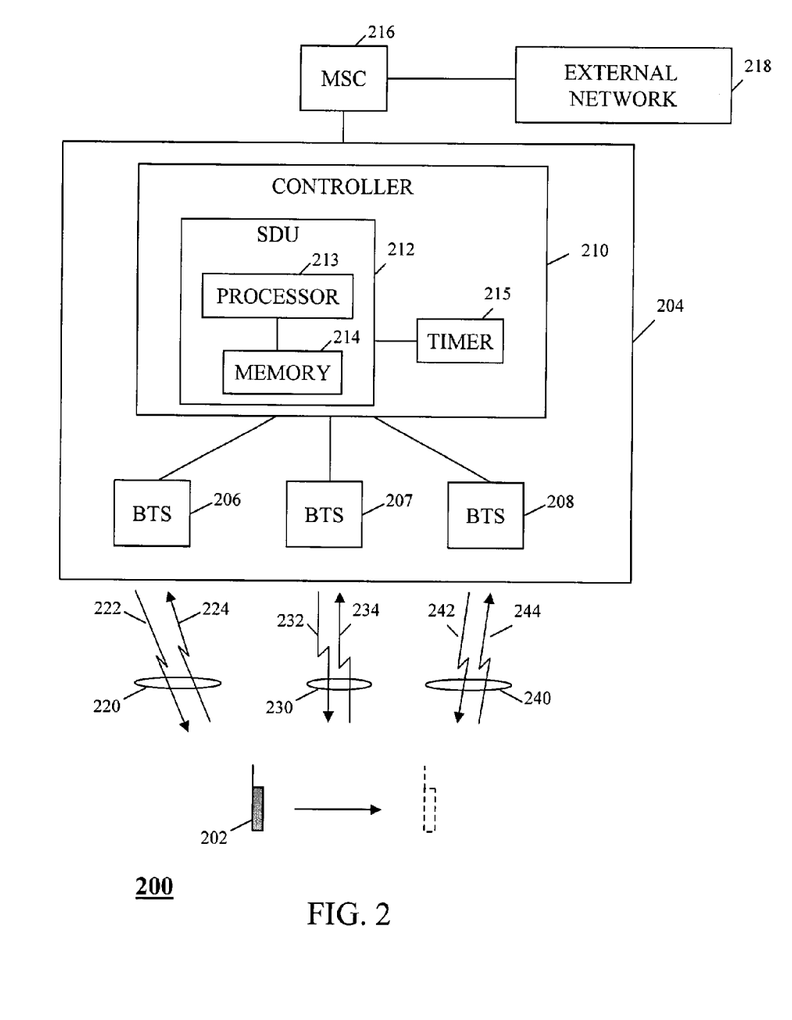
FIG. 2 is a block diagram of a wireless communication system in accordance with an embodiment of the present invention.

The present invention may be more fully described with reference to FIGS. 2-6. FIG. 2 is block diagram of a CDMA wireless communication system 200 in accordance with an embodiment of the present invention. Similar to communication system 100, communication system 200 includes a Base Station Subsystem (BSS) 204 comprising multiple Base Transceiver Stations (BTSs) 206-208 that are each coupled to a controller 210, such as a Base Station Controller (BSC) or a Central Base Station Controller (CBSC). BSS 204 is coupled to a mobile switching center (MSC) 216 and MSC 216 is in turn coupled to an external network 218 and provides a communication link between the external network, or other BSSs (not shown), and BSS 204. BSS 204 and MSC 216 may collectively be referred to as an infrastructure of communication system 200.

Controller 210, preferably a Selection and Distribution Unit (SDU) 212 included in the controller, comprises a processor 213 such as one or more microprocessors, microcontrollers, digital signal processors (DSPs), combinations thereof or such other devices known to those having ordinary skill in the art. Controller 210 further includes one or more memory devices 214 associated with processor 213, such as random access memory (RAM), dynamic random access memory (DRAM), and/or read only memory (ROM) or equivalents thereof, that store data and programs that may be executed by the processor.

Communication system 200 further includes a mobile station (MS) 202 that is concurrently in active communication with each BTS of multiple BTSs 206, 207. That is, MS 202 is in 'soft-handoff' mode with the multiple BTSs 206, 207 and each BTS of the multiple BTSs 206, 207 is a member of an 'active set' of MS 202. As members of the active set of MS 202, each BTS of the multiple BTSs 206, 207 concurrently maintains a respective wireless communication link 220, 230 with the MS. Each communication link 220, 230 includes a respective forward link 222, 232, for conveyance of signals to MS 202 and a respective reverse link 224, 234, for receipt of signals from the MS.

Preferably, communication system 200 is a Code Division Multiple Access (CDMA) communication system, in which each of forward links 222, 232, and 242 and reverse links 224, 234, and 244 comprises multiple communication channels, such as access channels, control channels, paging channels, and traffic channels. Each communication channel of a reverse link 224, 232, 242 or a forward link 224, 234, 244 comprises an orthogonal code, such as a Walsh Code, that may be transmitted in a same frequency bandwidth as the other channels of the link. However, those who are of ordinary skill in the art realize that communication system 200 may operate in accordance with any wireless telecommunication system, such as but not limited to a Global System for Mobile Communications (GSM) communication system, a Time Division Multiple Access (TDMA) communication system, a Frequency Division Multiple Access (FDMA) communication system, or an Orthogonal Frequency Division Multiple Access (OFDM) communication system.

When communication system 200 is operating in a soft handoff mode, a first plurality of frames transmitted by MS 202 is received by each BTS of the multiple BTSs 206, 207 in the active set of the MS via a respective reverse link 224, 234. Each BTS of the multiple BTSs 206, 207 then forwards to controller 210 the plurality of frames received by the BTS and further forwards one or more quality indicators that indicates a quality of the received plurality of frames.

The one or more quality indicators forwarded by each BTS 206, 207 are based on a frame quality metric that may be determined on frame-by-frame basis or may be determined with respect to the plurality of frames. For example, the frame quality metric may be a frame error rate (FER) that is determined with respect to the plurality of frames, or may be based on a bit error rate (BER), a signal-to-noise ratio (SNR), a signal strength, a carrier-to-interference ratio (CIR), or an $E_b/I_o$ ratio (energy per bit/interference power density (per Hertz)) that is determined with respect to one or more of the plurality of frames. Those who are of ordinary skill in the art realize that many quality metrics are known and may be used herein without departing from the spirit and scope of the present invention.

The quality indicator may then comprise the frame quality metric or may be an indicator representative of the frame quality metric. For example, a BTS may determine, with respect to each frame and based on the frame quality metric, whether the received frame is acceptable or erroneous. The BTS embeds a quality indicator in a header of the frame, which quality indicator indicates whether the frame is acceptable, that is, good, or erroneous, that is, erased. The BTS then forwards the frame and the embedded quality indicator to controller 210.

When controller 210 receives a plurality of frames and an associated one or more quality indicators from each of the multiple BTSs 206, 207, the controller stores the one or more quality indicators in association with the BTS sourcing the plurality of frames and/or the reverse link or communication link via which the plurality of frames are received, in one or more memory devices 214. Upon receiving a same frame from each of the multiple BTSs 206, 207, controller 210 then selects a frame from among the same frames received from each of the BTSs and forwards the selected frame to MSC 216. Unless otherwise indicated herein, all functions performed herein by controller 210 are preferably performed by SDU 212, and in particular by processor 213.

As MS 202 moves through communication system 200, the MS may head towards a coverage area, or sector, associated with a BTS not in the MS's active set, such as BTS 208, and away from a coverage area, or sector, associated with a BTS in the active set, such as BTS 206. As MS 202 moves toward BTS 208, a signal strength of a pilot signal received by MS 202 via a forward link 242 associated with BTS 208 increases until MS 202 identifies the pilot signal from BTS 208 as a viable communication link. In addition, as MS 102 heads away from BTS 206, a signal strength of a pilot signal received by MS 202 from BTS 206 via forward link 222 deteriorates to the point that MS 202 determines that communication link 220 is no longer a viable communication link. At that point, communication system 200 determines whether to execute a soft-handoff by adding BTS 208 (i.e., to the active set of MS 202) and communication link 240 and dropping BTS 206 (i.e., from the active set of MS 202) and communication link 220.

Figure 3:
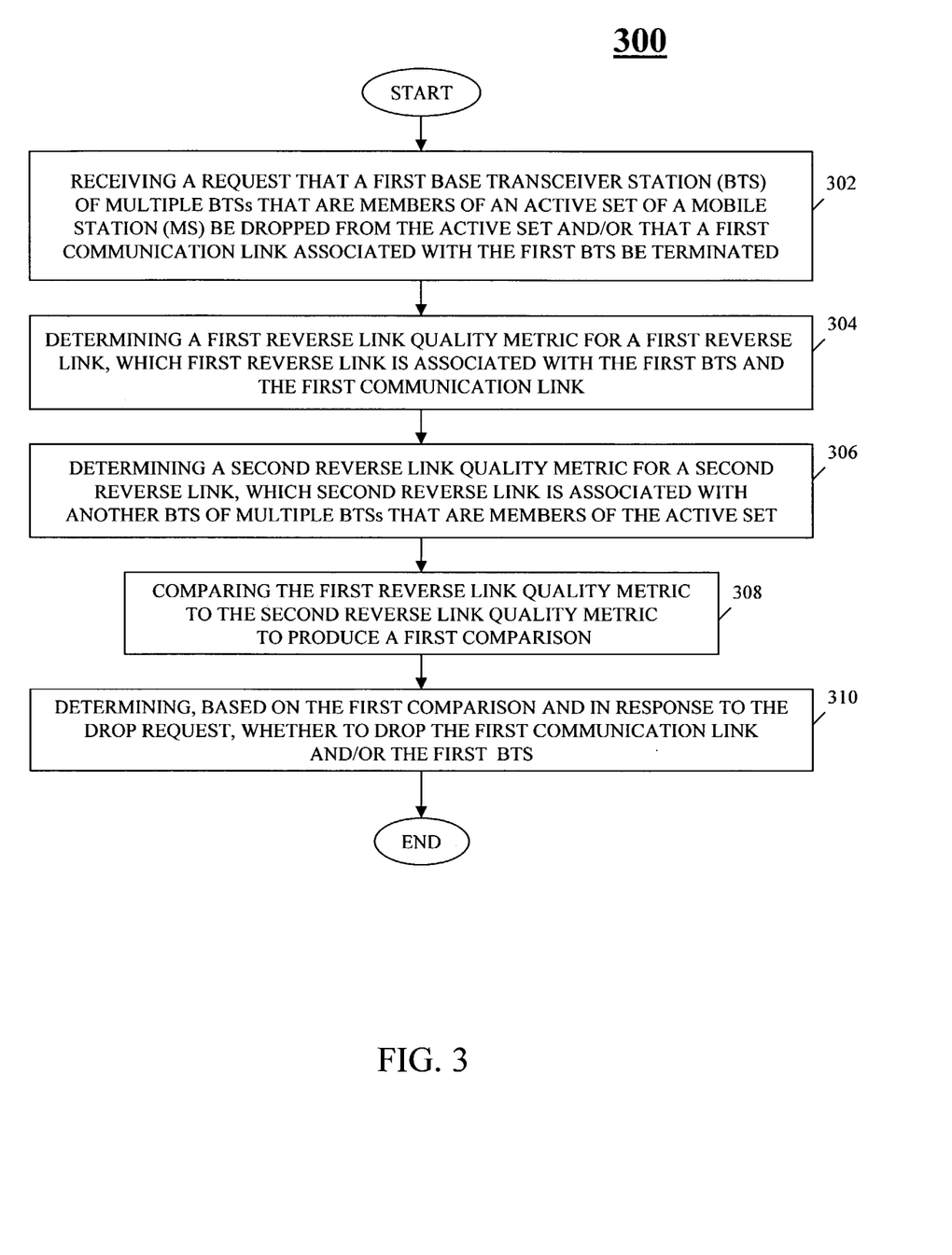
FIG. 3 is a logic flow diagram of a performance of a soft-handoff by the communication system of FIG. 2 in accordance with an embodiment of the present invention.

FIG. 3 is a logic flow diagram 300 of steps executed by communication system 200 in determining whether to execute a soft-handoff in accordance with an embodiment of the present invention. Logic flow diagram 300 begins when MS 202 conveys to communication system 100, and the communication system receives from the MS, a request that the communication system add BTS 208 to the MS's active set and establish a communication link 240 associated with BTS 208, comprising forward link 242 and a reverse link 244, as an active communication link for transmitting data to, and receiving data from, MS 202. MS 202 further conveys to communication system 100, and the communication system receives (302) from the MS, a request that the communication system drop a first BTS, that is, BTS 206, of the multiple BTSs 206, 207 in the active set of MS 202 and terminate, or drop, a first communication link associated with the first BTS, that is, communication link 220. Preferably, the request to drop BTS 206 and/or communication link 220 is conveyed by MS 202 by use of a Pilot Strength Measurement Message (PSMM) in which is embedded a request to drop the BTS and/or communication link.

In order to ensure that communication link 220 is not terminated, or dropped, as part of a soft-handoff until such time as communication system 200 can confirm that the communication system is not also dropping a good reverse link 224, communication system 200 first determines whether a reverse link is a good link before determining whether to drop a corresponding communication link. In one embodiment of the present invention, in order to determine whether reverse link 224 is a good link, controller 210 determines (304) a first reverse link quality metric for a first reverse link, that is, reverse link 224, which first reverse link is associated with the BTS 206 and communication link 220 under consideration to be dropped. Controller 210 further determines (306) a second reverse link quality metric for a second reverse link, which second reverse link is associated with another BTS of the multiple BTSs 206, 207 in the active set of MS 202, such as reverse link 234.

Controller 210 then compares (308) the first reverse link quality metric to the second reverse link quality metric to produce a comparison. Based on the comparison and in response to the drop request, controller 210 determines (310) whether to drop the first reverse link, that is, reverse link 224, and the associated first communication link, that is, communication link 220, and whether to drop the associated first BTS, that is, BTS 206, from the active set of MS 202. Logic flow diagram 300 then ends.

Controller 210 determines the first reverse link quality metric based on the plurality of frames received from MS 202 via the first reverse link, that is, reverse link 224, and more particularly based on a first one or more quality indicators associated with the plurality of frames received via the first reverse link. Controller 210 determines the second reverse link quality metric based on the plurality of frames received from MS 202 via the second reverse link, that is, reverse link 234, and more particularly based on a second one or more quality indicators associated with the plurality of frames received via the second link.

For example, in one embodiment of the present invention, in determining each of the first and second reverse link quality metrics, controller 210 retrieves, from the one or more memory devices 214, the one or more quality indicators stored with respect to a predetermined number of frames received via the corresponding reverse link and further received prior to receipt of the drop request. Preferably, the controller retrieves quality indicators associated with 120 immediately preceding frames; however, those who are of ordinary skill in the art realize that the number of frames used is not critical to the present invention and is up to a designer of system 200. In another embodiment of the present invention, controller 210 may retrieve one or more quality indicators stored with respect to frames received via the reverse link during a predetermined time period preceding the drop request. The predetermined number of frames or the predetermined time period may be maintained in the one or more memory devices 214.

When each of the first and the second one or more quality indicators comprises an indication of whether a received frame is a good frame or an erased frame, controller 210 may determine each of the first and second reverse link quality metrics by determining a quantity of erased frames based on the respective first and second one or more quality indicators. For example, in step 304, controller 210 may determine the first reverse link quality metric by determining a first quantity of erased frames received via the first reverse link, that is, reverse link 224. Similarly, in step 306, controller 210 may determine the second reverse link quality metric by determining a second quantity of erased frames received via the second reverse link, that is, reverse link 234. By way of another example, in step 304, controller 210 may determine the first reverse link quality metric by determining a first quantity of good frames received via the first reverse link, that is, reverse link 224. Similarly, in step 306, controller 210 may determine the second reverse link quality metric by determining a second quantity of good frames received via the second reverse link, that is, reverse link 234.

When the first reverse link quality metric and the second reverse link quality metric respectively comprise a first quantity of frames and a second quantity of frames, step 308 may comprise comparing the first quantity to the second quantity to produce a comparison. The resulting comparison may then comprise a differential between the first quantity, which corresponds to the first reverse link, that is, reverse link 224, and the second quantity, which corresponds to the second reverse link, that is, reverse link 234. The step of determining whether to drop communication link 220 and/or BTS 206, that is, step 310, may then comprise the following steps. When the determined differential exceeds a differential threshold that is stored in the one or more memory devices 214, controller 210 determines that the first reverse link, that is, reverse link 224, is no longer a good link. Controller 210 then determines to grant the drop request, that is, to drop communication link 220 and to drop BTS 206 from MS 202's active set. When the determined differential does not exceed the differential threshold, controller 210 determines that first reverse link, that is, reverse link 224, is still a good link and further determines to ignore the drop request, that is, to not drop reverse link 224, communication link 220 and BTS 206.

Although communication system 200, is depicted as including only two (2) BTS's in the active set of MS 202, those who are of ordinary skill in the art realize that the principles of the present invention described herein may be easily applied to a larger active set. For example, when more than two (2) reverse links are associated with the BTSs in the active set, controller 210 may compare the first reverse link quality metric, that is, the reverse link quality metric determined with respect to the reverse link under consideration to be dropped, to a best reverse link quality metric determined with respect to other reverse links associated with the BTSs in the active set. By way of another example, when more than two (2) reverse links are associated with the BTSs in the active set, controller 210 may compare the first reverse link quality metric to an average of the reverse link quality metrics determined with respect to the other reverse links. Those who are of ordinary skill in the art realize that other algorithms may be used herein for comparing a reverse link quality metric determined with respect to the reverse link under consideration for being dropped to a reverse link quality metric determined with respect to one or more other reverse links of BTSs in the active set, which other algorithms may be used herein without departing from the spirit and scope of the present invention.

Figure 4:
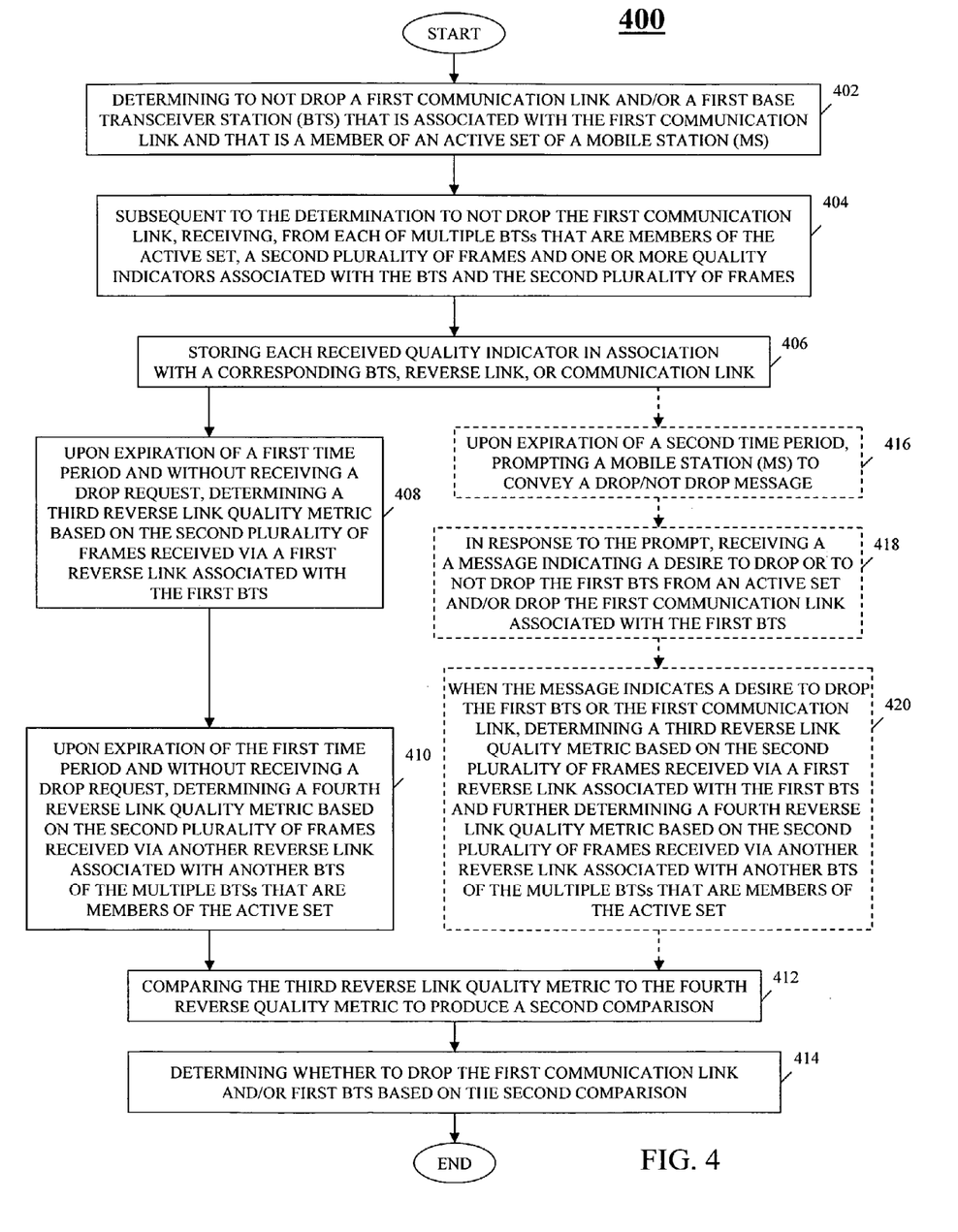
FIG. 4 is a logic flow diagram of a performance of a soft-handoff by the communication system of FIG. 2 in accordance with various embodiments of the present invention.

By determining whether a reverse link 224 associated with a communication link 220 or a BTS 206 sought to be dropped is still good, communication system 200 ensures that a communication link with a strong reverse link is not dropped in response to a drop request that is based on a weak forward link. As a result, the potential for dropping calls when the reverse link of the dropped communication link, such as reverse link 224 of communication link 220, is the only good reverse link of multiple reverse links in soft-handoff is minimized. In order to avoid dropping a good reverse link, a controller 210 compares a quality metric associated with the reverse link 224 of the communication link 220 sought to be dropped to quality metric(s) associated with one or more other reverse links 234 that are in a soft-handoff mode with reverse link 224, that is, that are associated with other BTSs 207 in a same active set of an MS 202 as BTS 206. Based on the comparison of the reverse link quality metrics, controller 210 is able to determine whether reverse link 224 is still a good link, or whether reverse link 224 may even be a best link among all of the reverse links 224, 234 associated with the MS, and thereby determine whether to drop the communication link 220 and/or BTS 206 sought to be dropped When communication system 200 determines, based on the comparison of the first reverse link quality metric to the second reverse link quality metric, to not drop first communication link 220 and/or first BTS 206, controller 210 may continue consideration of first BTS 206 and associated communication link 220 and as drop candidates and initiate another drop determination. FIG. 4 is a logic flow diagram 400 of steps performed by communication system 200 in making a subsequent determination of whether to drop communication link 220 and/or first BTS 206 after initially determining to not drop the link or BTS in accordance with various embodiments of the present invention. Logic flow diagram 400 begins when controller 210 determines (402) to not drop the first communication link, that is, communication link 220, and/or the first BTS, that is, BTS 206.

Subsequent to the determination to not drop the communication link and/or BTS, each BTS of the multiple BTSs 206, 207 in the active set of MS 202 receives a second plurality of frames from the MS and forwards the received second plurality of frames along with one or more quality indicators associated with the forwarded second plurality of frames to controller 210.

Upon receiving (404) the second plurality of frames and the associated one or more quality indicators from each of BTSs 206 and 207, controller 210 stores (406) each received quality indicator in association with a corresponding BTS, reverse link, or communication link in the one or more memory devices 214. When a first period of time expires without receiving a drop request from MS 202, controller 210 determines (408) a third reverse link quality metric for the first reverse link, that is, reverse link 224, based on the second plurality of frames received via the first reverse link, and preferably based on the one or more quality indicators stored with respect to the second plurality of frames received via the first reverse link. Controller 210 further determines (410) a fourth reverse link quality metric for the second reverse link, that is, reverse link 234, based on the second plurality of frames received via the second reverse link, and preferably based on the one or more quality indicators stored with respect to the second plurality of frames received via the second reverse link.

Controller 210 then compares (412) the third reverse link quality metric to the fourth reverse link quality metric to produce a second comparison. Based on the second comparison, controller 210 determines (414) whether to terminate, or drop, the first communication link, that is, communication link 220, and/or whether to drop the first BTS, that is, BTS 206, from the active set of MS 202. Logic flow diagram 400 then ends.

As noted above, in some embodiments of the present invention a reverse link quality metric may comprise a determined quantity, such as a quantity of acceptably received frames or a quantity of erroneously received frames. When the third reverse link quality metric comprises a third quantity and the fourth reverse link quality metric comprises a fourth quantity, step 412 may comprise comparing the third quantity to the fourth quantity to produce a quantity differential. In such an instance, step 414 may then comprise determining whether to drop communication link 220 and/or BTS 206 based on a comparison of the quantity differential to the differential threshold.

In another embodiment of the present invention as depicted in FIG. 4, wherein controller 210 continues consideration of communication link 220 and BTS 206 as drop candidates after a determination not to drop, instead of making a subsequent determination of whether to drop communication link 220 and/or BTS 206 without receiving a subsequent drop request, controller 210 may prompt (416) MS 202 to convey a drop/not drop message upon expiration of a second time period. The drop/not drop message indicates a desire of the MS to either drop or not drop communication link 220 and/or BTS 206. Preferably, controller 210 prompts MS 202 for the drop/not drop message by conveying a Pilot Measurement Request Order to the MS.

In response to receiving the prompt, MS 202 conveys to controller 210, and controller 210 receives (418) from the MS, a drop/not drop message that indicates a desire to either drop or not drop communication link 220 and/or BTS 206. Preferably, the drop/not drop message comprises a PSMM message in which the MS embeds an indication of whether to drop or not drop the communication link and/or BTS. When the drop/not drop message indicates a desire to drop communication link 220 and/or BTS 206, controller 210 determines (420) the third reverse link quality metric for first reverse link 224 and further determines the fourth reverse link quality metric for the second reverse link 234, the determination of which metrics are described in detail above with respect to steps 408 and 410. Logic flow diagram 400 then proceeds to step 412, where controller 210 compares the third reverse link quality metric to the fourth reverse link quality metric to produce a comparison and determines (414) whether to drop communication link 220 and/or BTS 206 based on the comparison. Logic flow diagram 400 then ends.

By providing for controller 210 to initiate a re-determination of whether to drop a communication link 220 and/or BTS 206, communication system 200 provides a proactive infrastructure that minimizes a risk associated with maintaining a possibly marginal communication link 220 and thereby allowing a communication with an MS to deteriorate to unacceptable levels as a result. After receiving a request to drop communication link 220 and/or BTS 206 and determining, in response to the drop request, to not drop the communication link or BTS, communication system 200, in particular controller 210, may re-determine whether to drop the communication link or BTS either on its own, without receiving another drop request, or by prompting MS 202 for a drop/not drop message. In re-determining whether to drop communication link 220 and/or BTS 206, controller 210 determines whether the associated reverse link 224 is still a good link based on frames received from MS 202 via reverse link 224 subsequent to the determination to not drop.

Figure 5:
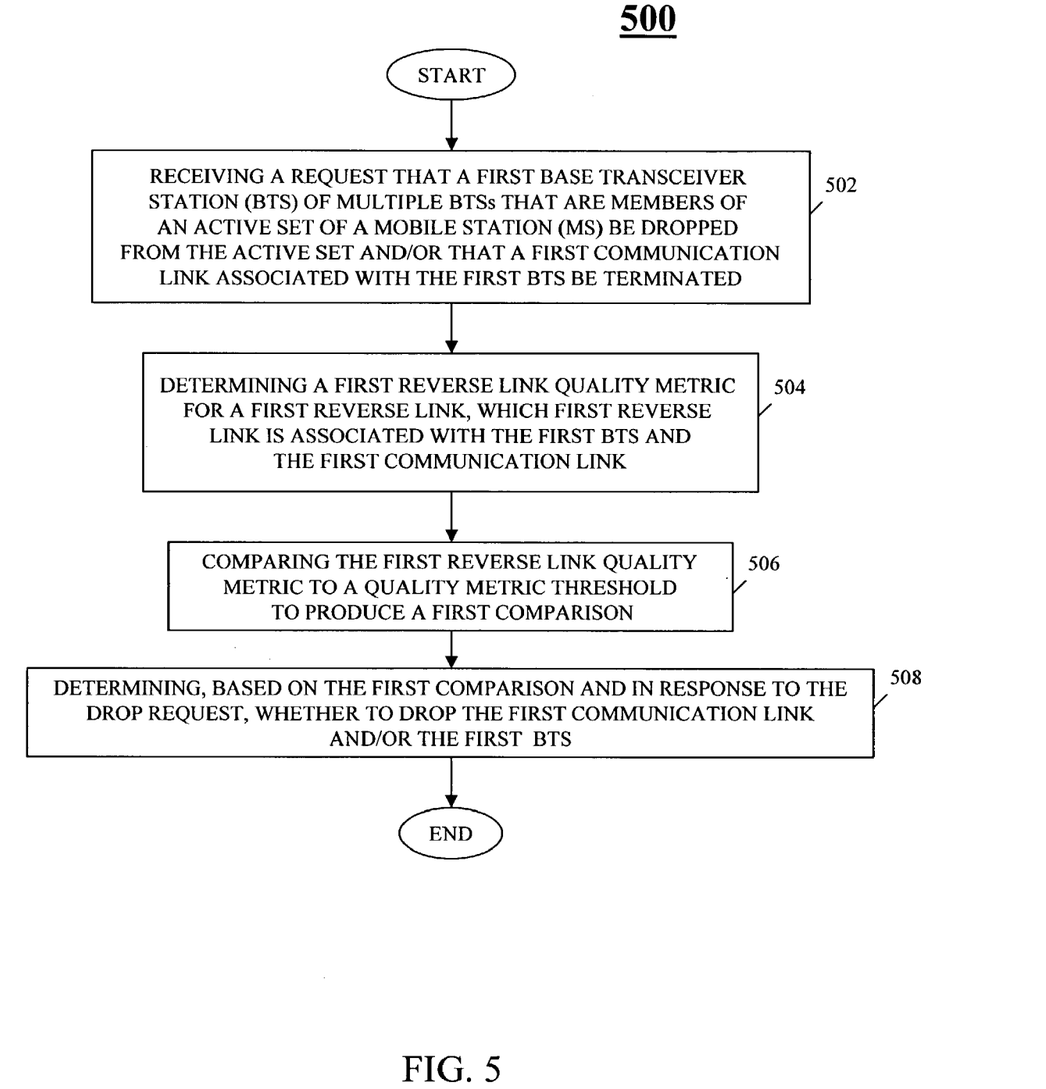
FIG. 5 is a logic flow diagram of a performance of a soft-handoff by the communication system of FIG. 2 in accordance with another embodiment of the present invention.

In another embodiment of the present invention, the determination of whether to execute a soft-handoff can be simplified by involving a determination of a reverse link quality metric with respect to only a single reverse link, that is, the reverse link 224 associated with the communication link 220 or BTS 206 under consideration to be dropped. FIG. 5 is a logic flow diagram 500 of steps executed by communication system 200 in determining whether to execute a soft-handoff in accordance with such an embodiment of the present invention. Logic flow diagram 500 begins when communication system 200 receives (502), from MS 202, a request that the communication system drop BTS 206 from the active set and/or terminate, or drop, communication link 220 and the associated reverse link 224. Controller 210 then determines (504) a first reverse link quality metric with respect to the reverse link sought to be dropped, that is, reverse link 224. Controller 210 compares (506) the first reverse link quality metric to a quality metric threshold that is stored in the one or more memory devices 214 to produce a first comparison. Based on the first comparison, controller 210 then determines (508) whether to drop communication link 220 and/or BTS 206. Logic flow 500 then ends.

As described above with respect to logic flow diagrams 300, controller 210 may determine the first reverse link quality metric based on one or more quality indicators stored with respect to a predetermined number of frames received via reverse link 224 prior to receipt of the drop request, or stored with respect to frames received via the reverse link during a predetermined time period preceding the drop request. When the stored one or more quality indicators comprises an indication of whether a frame is a good frame or an erased frame, step 504 may comprise determining, by controller 210, the first reverse link quality metric by determining a quantity of frames based on the stored quality indicators, such as a quantity of erased frames or a quantity of good frames received via reverse link 224. Step 506 may then comprise comparing, by controller 210, the determined quantity of frames to a threshold that is stored in the one or more memory devices 214 to produce the first comparison.

Step 508 may then comprise the following steps. Based on the first comparison, when the quantity of frames compares unfavorably with the threshold, controller 210 may determine that the reverse link, that is, reverse link 224, is no longer a good link and may further determine to drop communication link 220 and/or BTS 206. However, when the quantity of frames compares favorably with the threshold, controller 210 may determine that the reverse link, that is, reverse link 224, continues to be a good link and may further determine to not drop communication link 220 and/or BTS 206.

For example, when controller 210 determines, in step 504, a quantity of erased frames received via reverse link 224 and further determines, in step 506, that the determined quantity of erased frames exceeds an erased frame threshold, controller 210 may determine that reverse link 224 is no longer a good link. However, if the determined quantity of erased frames does not exceed the erased frame threshold, then controller 210 may determine that reverse link 224 continues to be a good link. By way of another example, when controller 210 determines, in step 504, a quantity of good frames received via reverse link 224 and further determines, in step 506, that the determined quantity of good frames exceeds a good frame threshold, controller 210 may determine that reverse link 224 continues to be a good link. However, if the determined quantity of good frames does not exceed the good frame threshold, then controller 210 may determine that reverse link 224 is no longer a good link.

Figure 6:
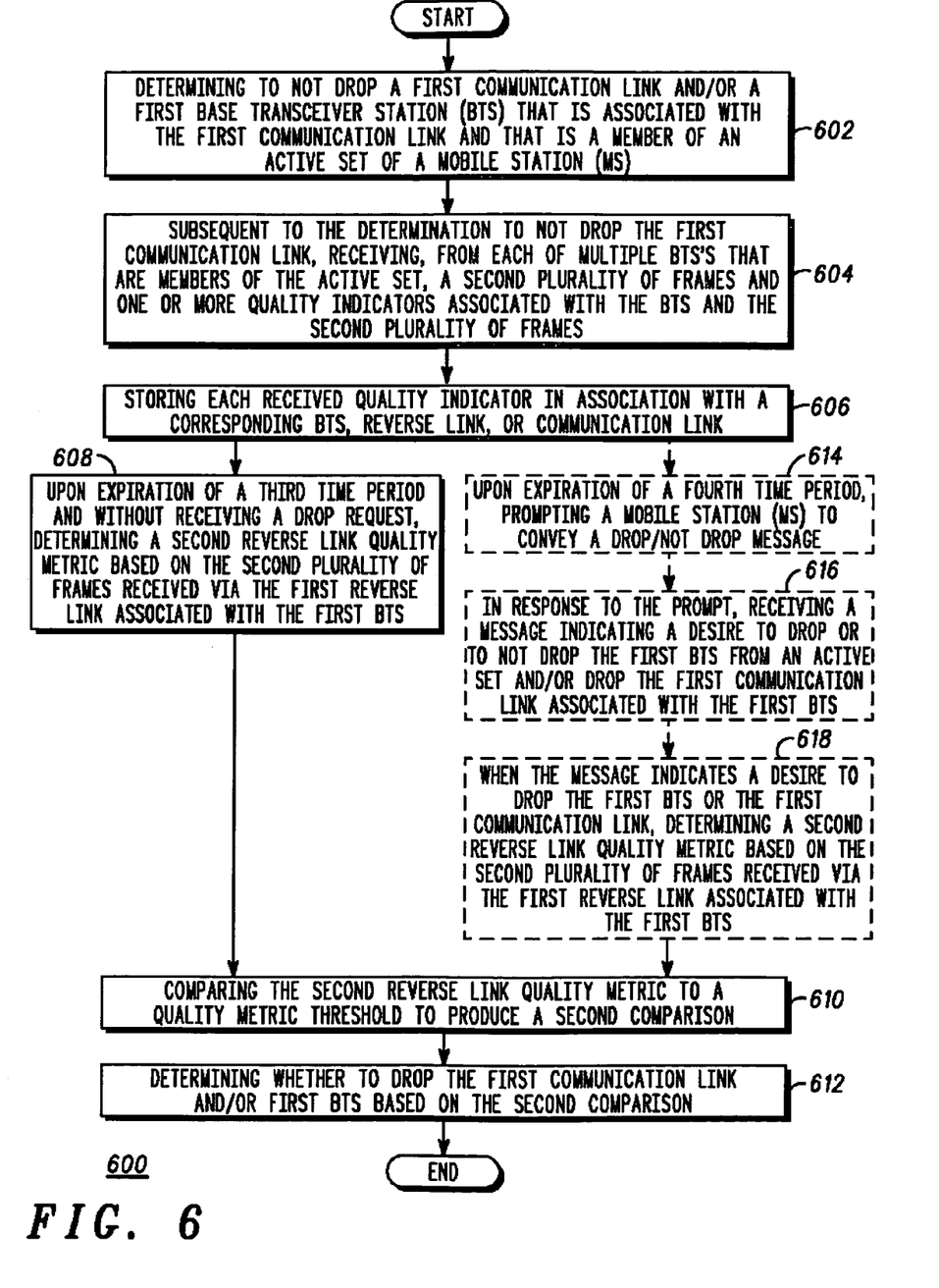
FIG. 6 is a logic flow diagram of a performance of a soft-handoff by the communication system of FIG. 2 in accordance with various embodiments of the present invention.

In yet another embodiment of the present invention, upon determining, at step 510, to not drop communication link 220 and/or BTS 206, controller 210 may continue consideration of communication link 220 and BTS 206 as drop candidates and initiate another drop determination. FIG. 6 is a logic flow diagram 600 of a performance of a soft-handoff by communication system 200 in accordance with various other embodiments of the present invention. Logic flow diagram 600 begins when controller 210 determines (602) to not drop communication link 220 and/or BTS 206. Subsequent to the determination to not drop, the BTS under consideration to be dropped, that is, BTS 206, receives a second plurality of frames from the MS via the reverse link under consideration to be dropped, that is, reverse link 224, and forwards the received second plurality of frames along with one or more associated quality indicators to controller 210.

Upon receiving (604) the second plurality of frames and the associated one or more quality indicators from BTS 206, controller 210 stores (606) the received one or more quality indicators in association with the corresponding BTS, reverse link, or communication link in the one or more memory devices 214. When a third period of time expires without receiving a drop request from MS 202, controller 210 determines (608) a second reverse link quality metric for reverse link 224 based on the second plurality of frames received via the reverse link, and preferably based on the one or more quality indicators stored with respect to the second plurality of frames received via the reverse link. Controller 210 then compares (610) the second reverse link quality metric to the quality metric threshold to produce a second comparison. Based on the second comparison, controller 210 determines (612) whether to drop communication link 220 and/or BTS 206. Logic flow diagram 600 then ends.

In another embodiment of the present invention as depicted in FIG. 6, wherein controller 210 continues consideration of communication link 220 and BTS 206 as drop candidates after a determination not to drop, instead of making a subsequent determination of whether to drop the reverse link, that is, reverse link 224, without receiving a subsequent drop request, controller 210 may prompt (614) MS 202 to convey a drop/not drop message upon expiration of a fourth time period. The drop/not drop message indicates a desire of the MS to either drop or not drop communication link 220 and/or BTS 206. Preferably, controller 210 prompts MS 202 for the drop/not drop message by conveying a Pilot Measurement Request Order to the MS.

Controller 210 determines each time period of the first, second, third, and fourth time periods referred to herein by reference to timer 215. Each of the first, second, third, and fourth time periods may be a predetermined time period or may be dynamically determined based on an algorithm, which time period or algorithm may be stored in the one or more memory devices 214.

In response to receiving the prompt, MS 202 conveys to controller 210, and controller 210 receives (616) from the MS, a drop/not drop message that indicates a desire to either drop or not drop communication link 220 and/or BTS 206. Preferably, the drop/not drop message comprises a PSMM message in which the MS embeds an indication of whether to drop or not drop the communication link and/or BTS. When the drop/not drop message indicates a desire to drop communication link 220 and/or BTS 206, controller 210 determines (618) the second reverse link quality metric for first reverse link 224, the determination of which metric is described in detail above with respect to step 608. Logic flow diagram 600 then proceeds to step 610, where controller 210 compares the second reverse link quality metric to the quality metric threshold to produce a second comparison and determines (612) whether to drop communication link 220 and/or BTS 206 based on the second comparison. Logic flow diagram 600 then ends.

In summarizing, an MS, such as MS 202, typically determines whether to drop a communication link, such as communication link 220, and/or a BTS, such as BTS 206, based on a performance of a forward link 222 associated with the communication link and BTS. In order to avoid dropping a communication link that has a weak forward link but a strong reverse link, communication system 200 determines whether a reverse link 224 associated with the communication link 220 or BTS 206 sought to be dropped is still good before determining to drop the communication link. In one embodiment of the present invention, communication system 200 determines whether reverse link 224 is still good by determining a quality metric associated with the reverse link and comparing the determined reverse link quality metric to quality metric(s) associated with one or more other reverse links 234 that are in a soft-handoff mode with reverse link 224, that is, that are associated with other BTSs 207 in a same active set of an MS 202 as BTS 206. In another embodiment of the present invention, communication system 200 determines whether reverse link 224 is still good by determining a quality metric associated with the reverse link and comparing the determined reverse link quality metric to a threshold. Based on the comparisons, controller 210 is able to determine whether reverse link 224 is still a good link, or whether reverse link 224 may even be the best link among all of the reverse links 224, 234 associated with the MS, and thereby determine whether to drop the communication link 220 and/or BTS 206 sought to be dropped.

Communication system 200 further provides for controller 210 to initiate a re-determination of whether to drop a communication link 220 and/or BTS 206, thereby preventing a communication with an MS to deteriorate to unacceptable levels as a result of maintaining a possibly marginal communication link 220. After determining, in response to a drop request, to not drop the communication link or BTS, communication system 200 may re-determine whether to drop the communication link or BTS either on its own, without receiving another drop request, or by prompting MS 202 for a drop/not drop message. In re-determining whether to drop communication link 220 and/or BTS 206, controller 210 determines whether the associated reverse link 224 is still a good link based on frames received from MS 202 via reverse link 224 subsequent to the determination to not drop.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for performing a soft-handoff in a wireless communication system comprising:
   receiving a first plurality of frames from a mobile station via each of a first reverse link and a second reverse link;
   determining a first reverse link quality metric based on the first plurality of frames received via the first reverse link, wherein determining the first reverse link quality metric comprises determining a first quantity of frames based on a quality indicator associated with the first plurality of frames received via the first reverse link;
   determining a second reverse link quality metric based on the first plurality of frames received via the second reverse link, wherein determining a second reverse link quality metric comprises determining a second quantity of frames based on a quality indicator associated with the first plurality of frames received via the second reverse link;
   receiving a request to drop a communication link comprising the first reverse link, wherein the request is generated based on a measurement of a forward link of the communication link;
   comparing the first quantity to the second quantity to produce a first comparison;
   in response to receiving the request, determining to not drop the communication link based on the first comparison;
   subsequent to determining to not drop the communication link, receiving a second plurality of frames via each of the first reverse link and the second reverse link subsequent to the determination to not drop the communication link;
   prompting the mobile station for a drop/not drop message indicating a desire to drop or not drop the communication link;
   in response to conveying the prompt, receiving a drop/do not drop message;
   when the drop/do not drop message indicates a desire to drop the communication link:
      determining a third reverse link quality metric based on the second plurality of frames received via the first reverse link;
      determining a fourth reverse link quality metric based on the second plurality of frames received via the second reverse link;
      comparing the third reverse link quality metric to the fourth reverse link quality metric to produce a second comparison; and
      determining whether to drop the communication link based on the second comparison.

2. The method of claim 1, wherein determining whether to drop the communication link based on the quantity differential comprises:
   comparing the quantity differential to a threshold; and
   determining whether to drop the communication link based on the comparison of the quantity differential to the threshold.

3. The method of claim 1, wherein each of the first reverse link quality metric and the second reverse link quality metric is determined based on whether each frame of the plurality of frames respectively received via the first reverse link and the second reverse link has been acceptably received or erroneously received.

4. The method of claim 3, wherein the first reverse link quality metric comprises a first quantity of frames acceptably received via the first reverse link, wherein the second reverse link quality metric comprises a second quantity of frames acceptably received via the second reverse link, wherein comparing comprises comparing the first quantity to the second quantity to produce a quantity differential, and wherein determining whether to drop the communication link comprises:
   determining to drop the communication link when the quantity differential is exceeds than the threshold; and
   determining to maintain the communication link when the quantity differential does not exceed the threshold.

5. The method of claim 3, wherein the first reverse link quality metric comprises a first quantity of frames erroneously received via the first reverse link, wherein the second reverse link quality metric comprises a second quantity of frames erroneously received via the second reverse link, wherein comparing comprises comparing the first quantity to the second quantity to produce a quantity differential, and wherein determining whether to drop the communication link comprises:
   determining to drop the communication link when the quantity of frames that has been erroneously received exceeds the threshold; and
   determining to maintain the communication link when the quantity of frames that has been erroneously received is less than the threshold.

6. The method of claim 1, wherein the plurality of frames comprises a first plurality of frames, wherein the comparison comprises a first comparison, wherein the plurality of frames comprises a first plurality of frames, wherein determining whether to drop the communication link comprises determining to not drop the communication link based in the first comparison, and wherein the method further comprises:

receiving a second plurality of frames via each of the first reverse link and the second reverse link subsequent to the determination to not drop the communication link;

determining a third reverse link quality metric based on the second plurality of frames received via the first reverse link;

determining a fourth reverse link quality metric based on the second plurality of frames received via the second reverse link;

comparing the third reverse link quality metric to the fourth reverse link quality metric to produce a second comparison; and without receiving, subsequent to the determination to not drop the communication link, a request to drop a communication link from the mobile station, determining whether to drop the communication link based on the second comparison.

7. A method for performing a soft-handoff in a wireless communication system comprising:

receiving a first plurality of frames from a mobile station via a reverse link;

determining a first reverse link quality metric based on the first plurality of frames;

receiving, from the mobile station, a request to drop a communication link comprising the reverse link, wherein the request is generated based on a measurement of a forward link of the communication link;

comparing the first reverse link quality metric to a threshold to produce a first comparison;

in response to receiving the request, determining to not drop the communication link based on the comparison;

subsequent to determining to not drop the communication link, prompting the mobile station by an apparatus of an infrastructure for a drop/not drop message indicating a desire to drop or not drop the communication link;

in response to conveying the prompt, receiving a drop/do not drop message from the mobile station;

when the drop/do not drop message indicates a desire to drop the communication link:

determining a second reverse link quality metric with respect to a second plurality of frames received via the reverse link;

comparing the second reverse link quality metric to the threshold to produce a second comparison; and determining whether to drop the communication link based on the second comparison.

8. The method of claim 7, wherein each of determining a first reverse link quality metric and determining a second reverse link quality metric comprises determining a quantity of frames based on a quality indicator associated with each frame of the plurality of frames, wherein comparing each of the first and second reverse link quality metrics to a threshold to produce a respective first and second comparison comprises comparing the respectively determined quantity to a threshold to produce a respective comparison.

9. The method of claim 7, wherein each of the first reverse link quality metric and the second reverse link quality metric is determined based on whether each frame of the respective first and second plurality of frames has been acceptably received or erroneously received.

10. The method of claim 9, wherein each of comparing the first reverse link quality metric to a threshold to produce a first comparison and comparing the second reverse link quality metric to a threshold to produce a second comparison comprises comparing a quantity of frames that has been acceptably received to a threshold and wherein determining whether to drop the communication link comprises:

determining to drop the communication link when the quantity of frames that has been acceptably received is less than the threshold; and determining to maintain the communication link when the quantity of frames that has been acceptably received exceeds the threshold.

11. The method of claim 9, wherein each of comparing the first reverse link quality metric to a threshold to produce a first comparison and comparing the second reverse link quality metric to a threshold to produce a second comparison comprises comparing a quantity of frames that has been erroneously received to a threshold and wherein determining whether to drop the communication link comprises:

determining to drop the communication link when the quantity of frames that has been erroneously received exceeds the threshold; and determining to maintain the communication link when the quantity of frames that has been erroneously received is less than the threshold.

12. In a wireless infrastructure, an apparatus for performing a soft-handoff comprising a processor that receives a first plurality of frames from a mobile station via each of a first reverse link and a second reverse link, determines a first reverse link quality metric based on the first plurality of frames received via the first reverse link, wherein determining the first reverse link quality metric comprises determining a first quantity of frames based on a quality indicator associated with the first plurality of frames received via the first reverse link, determines a second reverse link quality metric based on the first plurality of frames received via the second reverse link, wherein determining the second reverse link quality metric comprises determining a second quantity of frames based on a quality indicator associated with the first plurality of frames received via the second reverse link, compares the first quantity to the second quantity to produce a first comparison, receives a request to drop a communication link comprising the first reverse link, wherein the request is generated based on a measurement of a forward link of the communication link, in response to receiving the request, determines to not drop the communication link based on the first comparison, subsequent to determining to not drop the communication link, receives a second plurality of frames via each of the first reverse link and the second reverse link, prompts the mobile station for a drop/not drop message indicating a desire to drop or not drop the communication link, receives a drop/do not drop message in response to conveying the prompt, and when the drop/do not drop message indicates a desire to drop the communication link, determines a third reverse link quality metric based on the second plurality of frames received via the first reverse link, determining a fourth reverse link quality metric based on the second plurality of frames received via the second reverse link, compares the third reverse link quality metric to the fourth reverse link quality metric to produce a second comparison, and determines whether to drop the communication link based on the second comparison.

13. The apparatus of claim 12, wherein the apparatus further comprises one or more memory devices coupled to the processor and that store a threshold, and wherein the processor determines whether to drop the communication link based on the quantity differential by comparing the quantity differential to the threshold and determining whether to drop the communication link based on the comparison of the quantity differential to the threshold.

14. The apparatus of claim 12, wherein the processor determines each of the first reverse link quality metric and the second reverse link quality metric based on whether each frame of the plurality of frames respectively received via the first reverse link and the second reverse link has been acceptably received or erroneously received.

15. The apparatus of claim 14, wherein the first reverse link quality metric comprises a first quantity of frames acceptably received via the first reverse link, wherein the second reverse link quality metric comprises a second quantity of frames acceptably received via the second reverse link, wherein the processor compares the first reverse link quality metric to the second reverse link quality metric by comparing the first quantity to the second quantity to produce a quantity differential, and wherein the processor determines whether to drop the communication link by determining to drop the communication link when the quantity differential is exceeds than the threshold and determining to maintain the communication link when the quantity differential does not exceed the threshold.

16. The apparatus of claim 14, wherein the first reverse link quality metric comprises a first quantity of frames erroneously received via the first reverse link, wherein the second reverse link quality metric comprises a second quantity of frames erroneously received via the second reverse link, wherein the processor compares the first reverse link quality metric to the second reverse link quality metric by comparing the first quantity to the second quantity to produce a quantity differential, and wherein the processor determines whether to drop the communication link by determining to drop the communication link when the quantity of frames that has been erroneously received exceeds the threshold and determining to maintain the communication link when the quantity of frames that has been erroneously received is less than the threshold.

17. The apparatus of claim 12, wherein the plurality of frames comprises a first plurality of frames, wherein the comparison comprises a first comparison, wherein the plurality of frames comprises a first plurality of frames, wherein the processor determines to not drop the communication link based in the first comparison, and wherein the processor further receives a second plurality of frames via each of the first reverse link and the second reverse link subsequent to the determination to not drop the communication link, determines a third reverse link quality metric based on the second plurality of frames received via the first reverse link, determines a fourth reverse link quality metric based on the second plurality of frames received via the second reverse link, compares the third reverse link quality metric to the fourth reverse link quality metric to produce a second comparison, and without receiving, subsequent to the determination to not drop the communication link, a request to drop a communication link from the mobile station, determines whether to drop the communication link based on the second comparison.

18. In a wireless infrastructure, an apparatus for performing a soft-handoff comprising:
one or more memory devices;
a processor coupled to the one or more memory devices that receives a plurality of frames from a mobile station via a reverse link, stores a quality indicator associated with each frame of the plurality of frames in the one or more memory devices, determines a first reverse link quality metric based on the stored quality indicators, compares the first reverse link quality metric to a threshold to produce a first comparison, receives a request from the mobile station to drop a communication link comprising the reverse link, wherein the request is generated based on a measurement of a forward link of the communication link, in response to receiving the request, determines whether to drop the communication link based on the first comparison, subsequent to determining to not drop the communication link, prompts the mobile station for a drop/do not drop message, in response to conveying the prompt, receives a drop/do not drop message from the mobile station, and when the drop/do not drop message indicates a desire to drop the communication link, determines a second reverse link quality metric with respect to a second plurality of frames received via the reverse link, compares the second reverse link quality metric to the threshold to produce a second comparison, and determines whether to drop the communication link based on the second comparison.

19. The apparatus of claim 18, wherein the apparatus is at least one of a Base Station Controller, a Central Base Station Controller, and a Selection and Distribution Unit.

20. The apparatus of claim 18, wherein the processor determines each of the first reverse link quality metric and the second reverse link quality metric by determining a quantity of frames based on the quality indicator associated with each frame of the plurality of frames and wherein the processor compares each reverse link quality metric to a threshold by comparing the determined quantity to a threshold to produce the comparison.

21. The apparatus of claim 18, wherein each of the first reverse link quality metric and the second reverse link quality metric is determined based on whether each frame of the plurality of frames has been acceptably received or erroneously received.

22. The apparatus of claim 21, wherein the processor compares each of the first reverse link quality metric to a threshold and the second reverse link quality metric to a threshold by comparing a quantity of frames that has been acceptably received to a threshold and wherein the processor determines whether to drop the communication link by determining to drop the communication link when the quantity of frames that has been acceptably received is less than the threshold and determining to maintain the communication link when the quantity of frames that has been acceptably received exceeds the threshold.

23. The apparatus of claim 21, wherein the processor compares each of the first reverse link quality metric to a threshold and the second reverse link quality metric to a threshold by comparing a quantity of frames that has been erroneously received to a threshold and wherein the processor determines whether to drop the communication link by determining to drop the communication link when the quantity of frames that has been erroneously received exceeds the threshold and determining to maintain the communication link when the quantity of frames that has been erroneously received is less than the threshold.

* * * * *